United States Patent
Yamazaki et al.

(10) Patent No.: US 6,330,810 B1
(45) Date of Patent: Dec. 18, 2001

(54) CONDENSING APPARATUS FOR USE IN A REFRIGERATION CYCLE RECEIVER-DRYER USED FOR SAID CONDENSING APPARATUS

(75) Inventors: Keiji Yamazaki, Tochigi; Yoshihiko Seno; Osamu Kamoshida, both of Oyama; Yasuhiro Takahashi, Tochigi, all of (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/716,397

(22) Filed: Nov. 20, 2000

(30) Foreign Application Priority Data

Aug. 11, 2000 (JP) ................................. 12-244199

(51) Int. Cl.⁷ .................................................. F25B 43/00
(52) U.S. Cl. .............................................. 62/509; 62/474
(58) Field of Search ...................................... 62/474, 509

(56) References Cited

U.S. PATENT DOCUMENTS

| | | | |
|---|---|---|---|
| 4,707,999 | * | 11/1987 | Ohta et al. ............................. 62/474 |
| 5,666,791 | * | 9/1997 | Burk ...................................... 62/474 |
| 5,755,113 | * | 5/1998 | Ferguson et al. ...................... 62/474 |
| 5,910,165 | * | 6/1999 | Haramoto et al. ..................... 62/474 |
| 5,992,174 | * | 11/1999 | Mittelstrass ........................... 62/474 |
| 6,106,596 | * | 8/2000 | Haramoto et al. ..................... 96/135 |
| 6,122,929 | * | 9/2000 | Yamazaki .............................. 62/474 |
| 6,196,019 | * | 3/2001 | Higo et al. ............................. 62/474 |

* cited by examiner

Primary Examiner—William Doerrler
Assistant Examiner—Mark Shulman

(57) ABSTRACT

The condensing apparatus in a refrigeration cycle includes a condenser having a condensing portion and a receiver-dryer. The receiver-dryer includes a tank main body, a desiccant-filled-portion arranged so that an upper space is formed at an upper part in the tank main body, a refrigerant-introducing-passage for introducing the condensed refrigerant into the tank main body from the condenser, and a refrigerant-discharging-passage for discharging the liquefied refrigerant in the tank main portion. The refrigerant-introducing-passage has an outlet which opens toward an inner bottom of the tank main body. The refrigerant-discharging-passage penetrates the desiccant-filled-portion and has an inlet formed so as to open toward the upper space at an upper end of the desiccant-filled-portion and an outlet formed at a bottom portion of the tank main body. The condensed refrigerant is introduced into the inner bottom of the tank main body through the refrigerant-introducing-passage from the condensing portion of the condenser and passes through the desiccant-filled-portion upward to be accumulated in the upper space. The accumulated liquefied refrigerant is introduced into the inlet of the refrigerant-discharging-passage and flows out of the tank main body via the outlet.

20 Claims, 6 Drawing Sheets

CONDENSING APPARATUS FOR USE IN A REFRIGERATION CYCLE RECEIVER-DRYER USED FOR SAID CONDENSING APPARATUS

BACKGROUND OF THE INVENTION

1. Field of the Invention

This invention relates to a condensing apparatus for use in a refrigeration cycle applied to an air-conditioning system for automobiles, buildings, etc., and also relates to a receiver-dryer used for such a condensing apparatus.

2. Description of Related Art

FIG. 6 shows an expansion-valve system refrigeration cycle as one of typical refrigeration cycles. In the refrigeration cycle, the gaseous refrigerant of high temperature and high pressure sent out from a compressor CP is introduced into a condenser CD and exchanges heat with the ambient air to be cooled and condensed therein. The condensed refrigerant mostly in a liquefied state flows into a receiver-tank RT to be separated into a gaseous refrigerant and a liquefied refrigerant. Then, only the liquefied refrigerant flows out of the receiver-tank RT. The liquefied refrigerant is decompressed and expanded by an expansion-valve EV, and is introduced into an evaporator EP as a mist-like refrigerant of low pressure and low temperature. This mist-like refrigerant evaporates in the evaporator EP by absorbing latent heat from the ambient air to be turned into a gaseous refrigerant. Then, the gaseous refrigerant flows out of the evaporator EP, and is inhaled by the compressor CP. In FIG. 6, the spotted area indicates that a refrigerant is in a liquid state. In the meantime, the refrigeration flow rate is controlled by adjusting the opening degree of the expansion-valve EV in response to the signal sent from the heat-sensitive-coupler SC provided at the outlet side of the evaporator EP.

By the way, when the subcooling degree of the refrigerant condensed in the condenser CD is insufficient, the condensed refrigerant is unstable such that the refrigerant evaporates when it receives small quantity of heat and/or a small pressure loss occurs at a downstream side. This often causes deterioration and/or fluctuation of the refrigeration cycle efficiency. To cope with the above-mentioned problems, conventionally, a subcooling portion, which subcools the refrigerant condensed by the condenser CD to a temperature lower than the condensation temperature of the refrigerant by about 2–5° C., is provided so as to send the condensed refrigerant to the evaporator side as a stabilized liquid refrigerant. Usually, this subcooling portion is arranged at the downstream side of the receiver-tank RT. In many cases, such a subcooling portion is integrally provided to the condenser CD in view of the space efficiency.

On the other hand, in many cases, a receiver-dryer is used as the aforementioned receiver-tank RT. The receiver-dryer is provided with a desiccant-filled-portion therein to absorb the moisture components of the refrigerant. Such a receiver-dryer includes the so-called sandwich-type receiver-dryer having an upper space 33 above a desiccant-filled portion 32 and a lower space 34 below the desiccant-filled portion 32 as shown in FIGS. 8A–8C and the so-called bag-type receiver-dryer provided with a desiccant-filled portion 32 in one side therein as shown in FIG. 8D.

In the receiver-dryer having a sucking-pipe 36 shown in FIG. 8A, the refrigerant flowed into the upper space 33 via the refrigerant inlet 35 passes through the desiccant-filled-portion 32 to reach the lower space 34. Then, the liquefied refrigerant separated from the gaseous refrigerant is sucked up by the sucking-pipe 36 and flows out from the refrigerant outlet 37 provided at the top of the tank.

In the receiver-dryer having a supplying-pipe 38 shown in FIG. 8B, the refrigerant introduced from the refrigerant inlet 35 provided at the bottom portion flows up the supplying-pipe 38 to reach the upper space 33, and then passes through the desiccant-filled-portion 32 to reach the lower space 34. Then, the liquefied refrigerant separated from the gaseous refrigerant flows out from the refrigerant outlet 37 provided at the bottom of the tank.

In the inlet-outlet-confrontation-type receiver-dryer shown in FIG. 8C, the refrigerant introduced into the upper space 33 via the top refrigerant inlet 35 passes through the desiccant-filled-portion 32 to reach the lower space 34. Then, the liquefied refrigerant separated from the gaseous refrigerant flows out from the refrigerant outlet 37 provided at the bottom of the tank.

In the bag-type receiver-dryer shown in FIG. 8D, the refrigerant flowed into the tank via the refrigerant inlet 35 provided at the side portion of the tank contacts the desiccant-filed-portion 32, and the liquefied refrigerant separated from the gaseous refrigerant in the lower portion of the tank flows out from the refrigerant outlet 37 provided at the bottom of the tank. Among this bag-type receiver-dryer, there are a receiver-dryer having an outlet and an inlet both provided at an upper portion or a lower portion of a tank and a receiver-dryer having an outlet and an inlet provided at an upper portion and a lower portion of a tank, respectively.

In an air-conditioning system, it is always desired to improve the space efficiency and performance. Especially, in an automobile air-conditioner, in order to effectively use the limited body space, it is requested that the whole system be further miniaturized. In order to realize the aforementioned requests, it is necessary to reduce the amount of refrigerant sealed in the refrigeration cycle, to enhance the performance stability to load fluctuation (overcharge toughness) and to prevent performance deterioration with time due to continuous running (decline of leakage toughness). For this purpose, it is desired to secure a steady region, i.e., a stable region in a subcooled state of the refrigerant to the amount of sealed refrigerant, as widely as possible.

FIG. 7 is a correlation characteristic figure showing the correlation between a subcooling degree of the condensed refrigerant and an amount of sealed refrigerant obtained by a charge examination (cycle bench) of an automobile air-conditioner. In this correlation characteristic figure, it is ideal that the rising curve is steep until it reaches a steady region as shown by the phantom-line curve B and that the steady region has a wider range. However, in an automobile air-conditioner using a conventional subcooling system condenser, the rising curve is gentle until it reaches the steady region as shown by the solid-line curve A. Therefore, the steady region starting point delays toward the larger amount of a sealed refrigerant side, which results in a delayed refrigerant sealing timing and a narrow steady region width. This means that in the conventional automobile air-conditioner the miniaturization by decreasing the sealed refrigerant amount is difficult, the performance stability to load fluctuation is bad, and the performance tends to deteriorate with time due to continuous running.

The inventors investigated causes of the above-mentioned problems of the conventional automobile air-conditioner from various aspects so as to realize a miniaturized high-performance automobile air-conditioner. Consequently, the inventors revealed that one factor of the above-mentioned problems resides in a structure of a conventional receiver-dryer RD. That is, since the interface between the liquefied refrigerant and the gaseous refrigerant, i.e., the surface of the liquefied refrigerant, near the refrigerant outlet of the receiver-dryer RD is hard to become stable, the stable supply of the liquefied refrigerant to the following cycle part cannot be performed. Furthermore, a large amount of gaseous refrigerant will be mixed into the liquefied refrigerant to be flowed out. Therefore, the above-mentioned steady region becomes narrower and the steady region starting point delays toward the larger amount of a sealed refrigerant side.

That is, since a refrigerant flow velocity flowing into a receiver-dryer RD from a condenser CD is generally high, in a sandwich-type receiver-dryer, larger turbulence of the liquefied refrigerant occurs in the upper space 33 into which the refrigerant is introduced. Consequently, since the liquefied refrigerant stagnates in the upper space 33, the liquefied refrigerant is not fully supplied to the lower space 34. As a result, a few amount of liquefied refrigerant accumulated in the lower space 34 is disturbed by the high-speed liquid flow passed through the desiccant-filled-portion 32, which causes bubbles of gaseous refrigerant. For this reason, it is assumed that a gaseous refrigerant flows out of the refrigerant outlet 37 exposed to the gaseous phase due to large surface fluctuation, and/or a lot of air bubbles are involved into the liquefied refrigerant to be flowed out.

On the other hand, in the bag-type receiver-dryer, it is assumed that since the internal refrigerant flow velocity and the turbulence of the internal refrigerant are larger than in the sandwich-type receiver-dryer, the liquefied refrigerant surface near the refrigerant outlet 37 becomes further unstable, resulting in a larger outflow of gaseous refrigerant.

Accordingly, the inventors further conducted the researches based on the above-mentioned knowledge, and found out the followings and completed the present invention. That is, an adoption of a specific structure of a receiver-dryer stabilizes a surface of a liquefied refrigerant separated from a gaseous refrigerant near a refrigerant outlet, which enables a stable supply of the liquefied refrigerant to the following cycle part. In addition, bubbles of a gaseous refrigerant smoothly change to a gaseous refrigerant at the interface of the gaseous refrigerant and the liquefied refrigerant, and the mixing of the gaseous refrigerant into the liquefied refrigerant to be flowed out is decreased effectively. This enables a decreased amount of sealed refrigerant of a refrigeration cycle, and an enlarged steady region of the refrigerant to the amount of sealed refrigerant making the best use of the capacity of the receiver-dryer. Consequently, it is possible to provide a condensing apparatus suitably used for an automobile air-conditioner using a subcooling system condenser.

SUMMARY OF THE INVENTION

An object of the present invention is to provide a condensing apparatus for use in a refrigeration cycle in which a surface of a liquefied refrigerant separated from a gaseous refrigerant can be stabilized and only the liquefied refrigerant can be supplied from the receiver-dryer to the subsequent cycle part.

Another object of the present invention is to provide a receiver-dryer used for the above-mentioned condensing apparatus in which the surface of the liquefied refrigerant separated from the gaseous refrigerant can be stabilized and only the liquefied refrigerant can be supplied to the subsequent cycle part.

According to the first aspect of the present invention, a condensing apparatus includes a condenser having a condensing portion for condensing a gaseous refrigerant and a receiver-dryer which receives the condensed refrigerant condensed by the condensing portion of the condenser, separates the condensed refrigerant into a gaseous refrigerant and a liquefied refrigerant, and removes moisture contained in the condensed refrigerant, wherein the receiver-dryer includes a tank main body, a desiccant-filled-portion arranged so that an upper space is formed in the tank main portion at an upper part of the tank main body, a refrigerant-introducing-passage for introducing the condensed refrigerant into the tank main body from the condenser, and a refrigerant-discharging-passage for discharging the liquefied refrigerant in the tank main body, wherein the refrigerant-introducing-passage has an outlet opening toward an inner bottom side of the tank main body, wherein the refrigerant-discharging-passage penetrates the desiccant-filled-portion and has an inlet formed so as to open toward the upper space at an upper end of the desiccant-filled-portion and an outlet formed at a bottom portion of the tank main body, whereby the condensed refrigerant is introduced into an inner bottom of the tank main body through the outlet of the refrigerant-introducing-passage from the condensing portion of the condenser, and passes through the desiccant-filled-portion upward to be accumulated in the upper space, and the accumulated liquefied refrigerant is introduced into the inlet of the refrigerant-discharging-passage and flows out of the tank main body via the outlet.

According to the second aspect of the present invention, a receiver-dryer is arranged at a downstream side of a condensing portion of a condenser in a refrigeration cycle to receive a condensed refrigerant condensed by the condensing portion of the condenser, separate the condensed refrigerant into a gaseous refrigerant and a liquefied refrigerant and remove moisture contained in the condensed refrigerant. The receiver-dryer includes a tank main body, a desiccant-filled-portion arranged so that an upper space is formed at an upper part in the tank main body, a refrigerant-introducing-passage for introducing the condensed refrigerant into the tank main body from the condenser, and a refrigerant-discharging-passage for discharging the liquefied refrigerant in the tank main body. The refrigerant-introducing-passage has an outlet which opens toward an inner bottom side of the tank main body. The refrigerant-discharging-passage penetrates the desiccant-filled-portion and has an inlet formed so as to open toward the upper space at an upper end of the desiccant-filled-portion and an outlet formed at a bottom portion of the tank main body. Whereby the condensed refrigerant is introduced into an inner bottom of the tank main body through the outlet of the refrigerant-introducing-passage from the condensing portion of the condenser, and passes through the desiccant-filled-portion upward to be accumulated in the upper space, and the accumulated liquefied refrigerant is introduced into the inlet of the refrigerant-discharging-passage and flows out of the tank main body via the outlet.

In the above-mentioned condensing apparatus or receiver-dryer, the refrigerant, which is a mixture of a gaseous refrigerant and a liquefied refrigerant sent to the receiver-dryer from the condenser, is abruptly diffused at the outlet of the refrigerant-introducing-passage into a wide area of the inner bottom portion of the tank main body to thereby reduce the flow velocity. Subsequently, the refrigerant goes up through the desiccant-filled-portion. At this time, the desiccant-filled-portion functions as a resistance layer which reduces the refrigerant flow velocity. Therefore, the liquefied refrigerant, which is slow in flow velocity as compared with a gaseous refrigerant, passes through the desiccant-filled-portion to reach the upper space, which causes a reduced flow velocity. Accordingly, the liquefied refrigerant accumulates in the upper space without causing turbulence. On the other hand, the flow velocity of the gaseous refrigerant also abruptly reduces when the gaseous refrigerant passes through the desiccant-filled-portion. For this reason, when the gaseous refrigerant reaches the accumulated liquefied refrigerant accumulated in the upper space, it slowly goes up in the liquefied refrigerant as bubbles. Consequently, a gaseous refrigerant passes through the surface of the accumulated liquefied refrigerant and accumulates above the surface without disturbing the surface. Since the inlet of the refrigerant-discharging-passage is located at the bottom of the accumulated liquefied refrigerant stably accumulated in the upper space, only the accumulated liquefied refrigerant flows into the refrigerant-discharging-passage from the inlet thereof, and is thus stably supplied to the following cycle part.

Since only the liquefied refrigerant stably flows out from the receiver-dryer as mentioned above, it becomes possible to fill an appropriate amount of the refrigerant in the refrigeration cycle at an earlier stage. Moreover, since the steady region between the optimum point and the excessive point of a refrigerant amount can be expanded by using the surplus space in a receiver-dryer as a buffer space, the whole refrigeration cycle can be operated stably. Furthermore, since the operation pressure can be kept low, a required power can be reduced, resulting in an improved system coefficient, which enables a miniaturized high efficient air-conditioner used for an automobile air-conditioner or the like. Moreover, the aforementioned condensing apparatus or the aforementioned receiver-dryer can be manufactured without greatly changing the fundamental structure of a conventional condensing apparatus or a receiver-dryer, which is advantageous in manufacturing cost.

In the above-mentioned condensing apparatus, it may further includes a subcooling portion which subcools the refrigerant condensed by the condensing portion of the condenser, wherein the outlet of the condensing portion of the condenser is connected to the inlet of the refrigerant-introducing-passage of the receiver-dryer, and wherein the outlet of the refrigerant-discharging-passage of the receiver-dryer is connected to the inlet of the subcooling portion. In this case, since only the liquefied refrigerant is stably supplied to the subcooling portion from the receiver-dryer, the subcool function by the subcooling portion can be demonstrated to the maximum extent, and thus a sufficient subcool region can be secured. Moreover, the subcooling portion may be integrally provided at a downstream side of the condensing portion of the condenser.

It is preferable that the inlet of the refrigerant-discharging-passage has an enlarged-diameter-portion having a diameter enlarging toward the upper space. In this case, since the inlet of the refrigerant-discharging-passage serves as a dented portion at the upper end of the desiccant-filled-portion, the liquefied refrigerant easily flows into the refrigerant-discharging-passage. Furthermore, since the flow velocity at the enlarged-diameter-portion is lower than that at the inner side of the non-enlarged-diameter-portion, even if bubbles of the gaseous refrigerant appear near the inlet, the bubbles easily go upward in the enlarged-diameter-portion.

The functions caused by the enlarged-diameter-portion of the refrigerant-introducing-passage can be effectively obtained when the following conditions are satisfied:

$$d1 < d2 \leq 3d1,$$

and $$d1 < h1 \leq 5d1,$$

wherein the inner diameter of the non-enlarged-diameter-portion of the inlet of the refrigerant-discharging-passage, the maximum opening diameter of the enlarged-diameter-portion and the depth of the enlarged-diameter-portion are defined by d1, d2 and h1, respectively.

The inlet of the refrigerant-discharging-passage may have a cylindrical bubble-swallow-prevention wall extending upward from the upper end of the enlarged-diameter-portion. In this case, by the existence of the bubble-swallow-prevention wall, the bubbles of the gaseous refrigerant going up through the accumulated liquefied refrigerant in the upper space becomes hard to be involved into the liquefied refrigerant flowing toward the outlet, resulting in a decrease amount of gaseous refrigerant flowed into the refrigerant-discharging-passage.

The functions of the bubble-swallow-prevention wall can be effectively obtained when the following condition is satisfied:

$$h2 \leq 2d1,$$

wherein the inner diameter of the refrigerant-discharging-passage and the height of the bubble-swallow-prevention wall are defined by d1 and h2, respectively.

It is preferable that the following conditions are satisfied:

$$1.5\phi \leq L1 \leq 0.8D,$$

wherein the distance between the center of the refrigerant-introducing-passage and the center of the refrigerant-discharging-passage, the inner diameter of the tank main body and the opening diameter of the outlet of the refrigerant-introducing-passage are defined by L1, D and $\phi$, respectively. In this case, since the opening center of the refrigerant-introducing-passage and the outlet center of the refrigerant-discharging-passage are moderately apart from each other, the upstream flow of the refrigerant introduced from the refrigerant-introducing-passage will not concentrate on the inlet side of the refrigerant-discharging-passage and the refrigerant flow velocity sufficiently decreases. Thus, the refrigerant surface can be further stabilized.

Moreover, it is preferable that the following condition is satisfied:

$$Ld < 0.7Le,$$

wherein a vertical length of the desiccant-filled-portion and an effective vertical length of the tank main body are defined by Ld and Le, respectively. In this case, a sufficient space for accumulating the liquefied refrigerant and the gaseous refrigerant in the upper part of the tank main body can be secured. Therefore, the stable region of the refrigerant to the amount of sealed refrigerant can be enlarged by fully using the capacity of the receiver-dryer.

It is desirable that a space is formed between the lower end of the desiccant-filled-portion and the inner bottom of the tank main body and the space has a vertical height of 25% or less of the vertical length of the desiccant-filled-portion. In this case, since the space exists at the lower side of the desiccant-filled-portion, the refrigerant flowed from the refrigerant-introducing-port can be smoothly diffused, resulting in an enhanced flow velocity drop functions by the diffusion, which forms further stabilized interface between the gaseous refrigerant and the liquefied refrigerant. Moreover, the lower space is small, a turbulent flow region is hard to be produced and there is no room to generate a large amount of accumulated liquefied refrigerant, which enables a sufficient supply of the liquefied refrigerant to the upper space.

It is preferable that the desiccant-filled-portion includes a pair of porous dividing walls arranged at a predetermined interval, a dryer including spherical particles filled up between the porous dividing walls and a filter arranged between the dryer and at least one of the porous dividing walls. In this case, the refrigerant going up through the desiccant-filled-portion passes through among the spherical particles while changing its direction frequently, it follows a long course. Therefore, the flow velocity of the refrigerant decreases remarkably and a local high-speed refrigerant flow disappears by the rectification function, which causes an equalized upstream flow as a whole. Moreover, since the liquefied refrigerant and the gaseous refrigerant are finely dispersed by the rectification functions of the filter, the accumulated liquefied refrigerant can be further stabilized in the upper space.

BRIEF DESCRIPTION OF THE DRAWINGS

The present invention will be more fully described and better understood from the following description, taken with the appended drawings, in which.

DETAILED DESCRIPTION OF THE PREFERRED EMBODIMENTS

Preferred embodiments of the present invention will now be described, in detail, with reference to the accompanying drawings.

Figure 1:
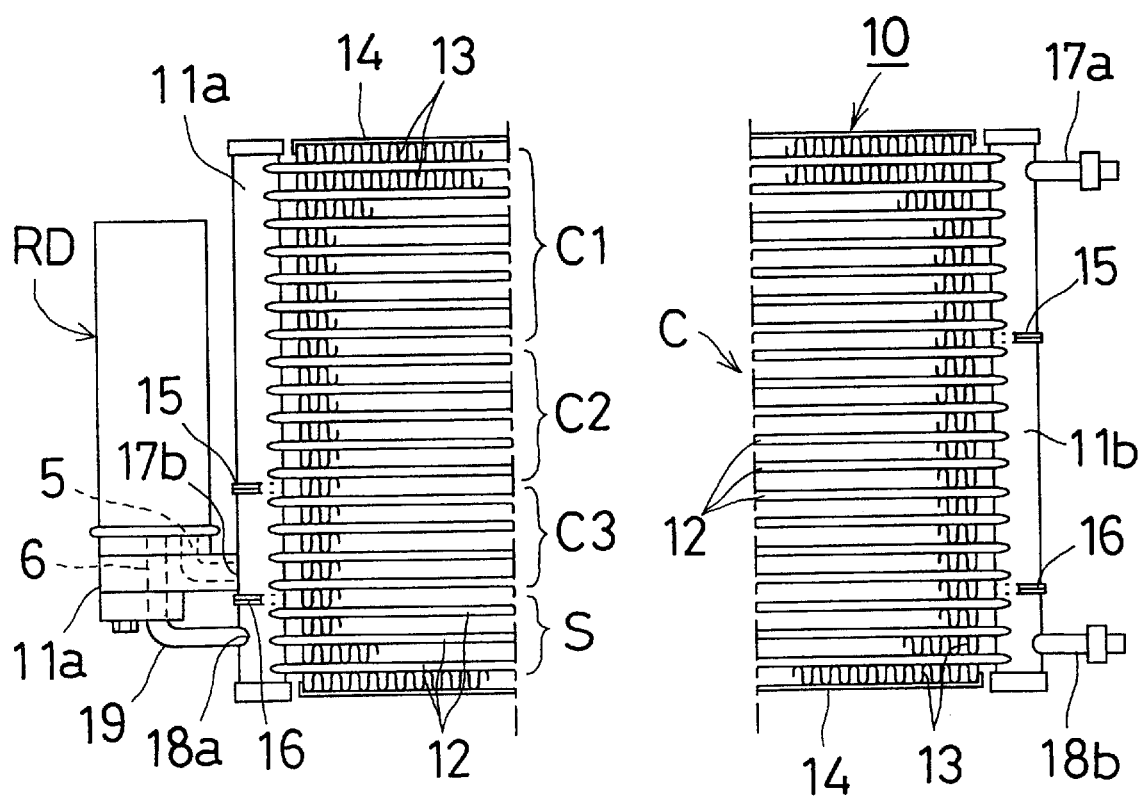
FIG. 1 is a front view showing an embodiment of a condensing apparatus in a refrigeration cycle according to the present invention.
Figure 2:
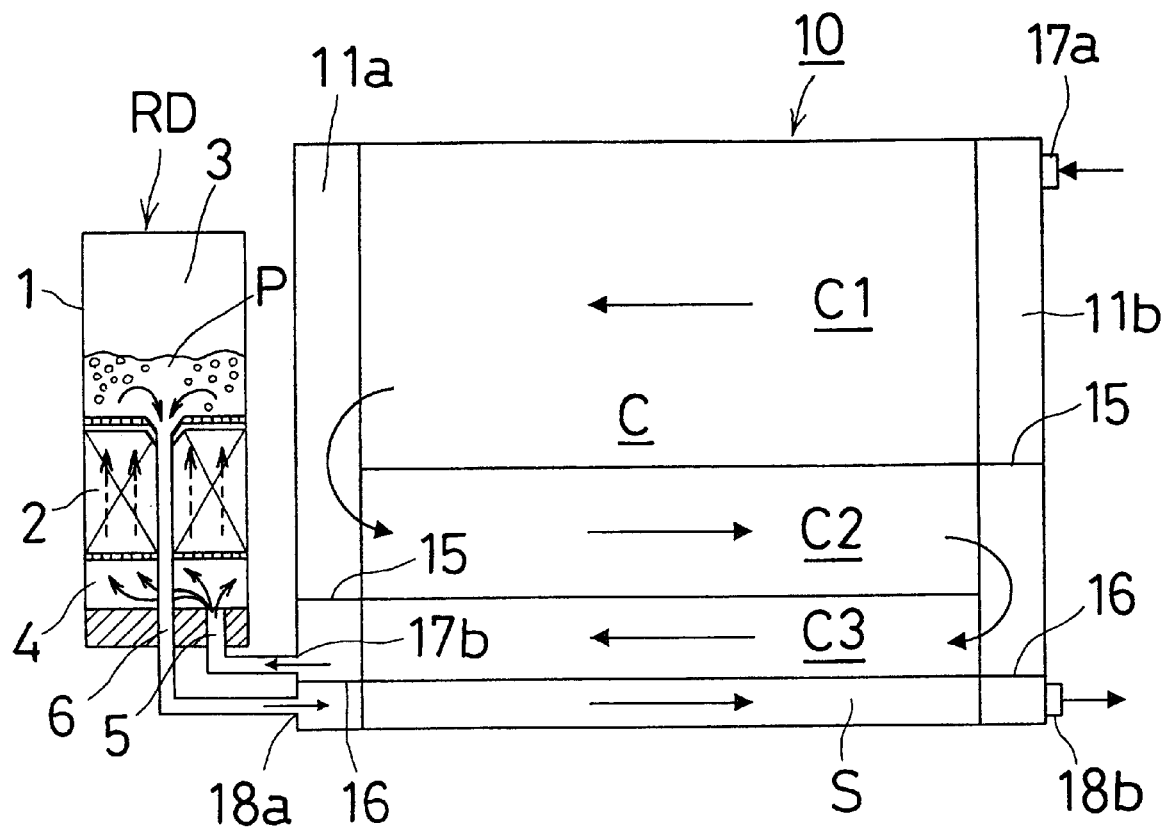
FIG. 2 is a vertical front view showing the flow of the refrigerant in the condensing apparatus.
Figure 3:
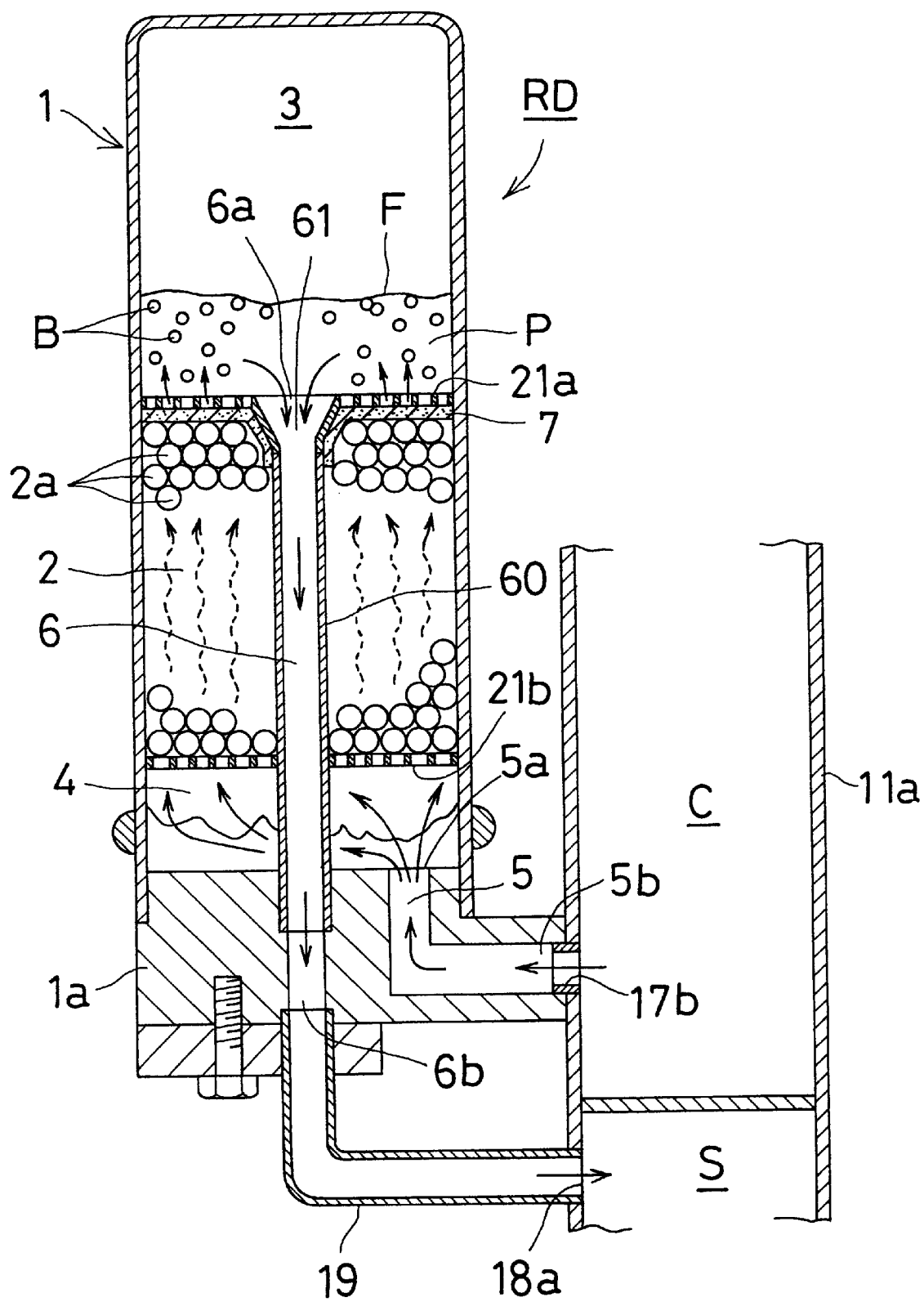
FIG. 3 is an enlarged vertical cross-sectional front view of the receiver-dryer of the condensing apparatus.
Figure 4:
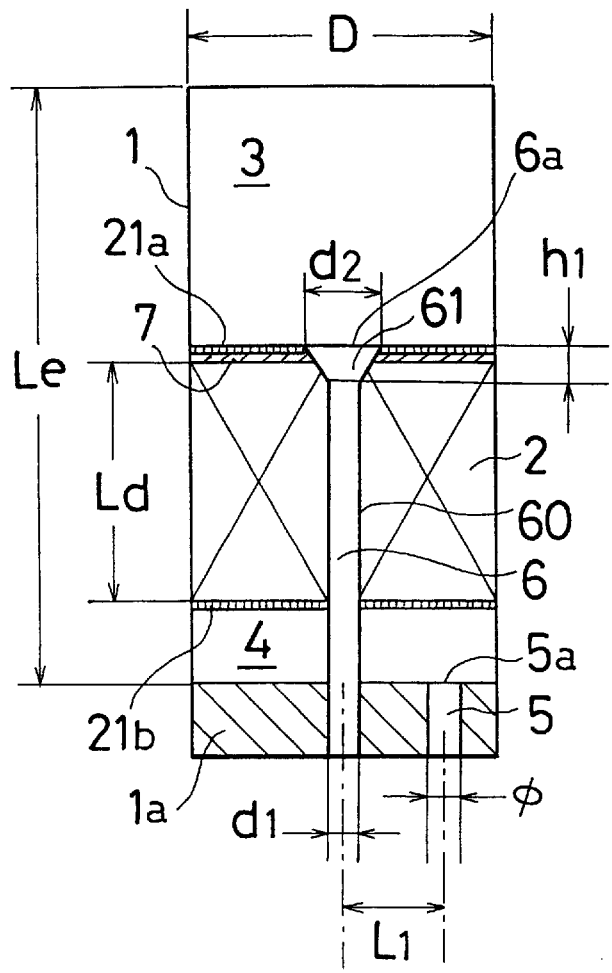
FIG. 4 is a schematic vertical cross-sectional front view showing the size relation of each part of the receiver-dryer.

FIG. 1 is a front view of a condensing apparatus. FIG. 2 is a vertical cross-sectional front view showing the refrigerant flow in the condensing apparatus. FIG. 3 is an enlarged vertical cross-sectional front view of the receiver-dryer of the condensing apparatus. FIG. 4 is a schematic vertical cross-sectional front view showing the size relation of each part of the receiver-dryer.

FIG. 1 shows a subcooling system condenser 10. The condenser 10 includes a condensing portion C and a subcooling portion S integrally provided to the condensing portion C. This condenser 10 is provided with a pair of right and left vertical headers 11a and 11b spaced apart from each other and a plurality of flat heat exchanging tubes 12 disposed horizontally between the headers 11a and 11b at certain intervals with both ends of thereof being communicated with the corresponding headers 11a and 11b. A corrugated fin 13 is arranged on the outside of each outermost heat exchanging tube 12. Between the adjacent heat exchanging tubes 12 and 12, corrugated fins 13 are arranged.

A side plate 14 for protecting the corrugated fin 13 is arranged on the outside of each outermost heat exchanging tube 12.

In the lower portion of each header 11a and 11b, partition members 16 each for dividing the inside of the header are provided at the same height. The upper side of the condenser 10 above the partition members 16 and 16 and the lower side thereof below the partition members 16 and 16 constitute a condensing portion C and a subcooling portion S, respectively. In the condensing portion C, the aforementioned plurality of tubular elements 12 are divided into the first pass C1 to the third pass C3 by partition members 15 and 15 provided in the headers 11a and 11b at predetermined positions.

Furthermore, at the upper and lower end portions of the right-hand header 11b, a condensing portion inlet 17a and a subcooling portion outlet 18b are provided, respectively. At the lower end portion of the left-hand header 11a corresponding to the condensing portion C and the lower end portion corresponding to the subcooling portion S, a condensing portion outlet 17b and a subcooling portion inlet 18a are provided, respectively.

In the subcooling system condenser 10, a receiver-dryer RD is attached to the left-hand header 11a along the header 11a.

As shown in FIG. 3, this receiver-dryer RD is equipped with a tank main body 1 of a vertical cylindrical type. In this tank main body 1, a desiccant-filled-portion 2 is provided at the longitudinal central portion of the tank main body 1 to form an upper space 3 above the desiccant-filled-portion 2 and a lower space 4 below the desiccant-filled-portion 2. At the position apart from the center of the bottom wall 1a of the tank main body 1, a refrigerant-introducing-passage 5 is provided such that the outlet 5a of the refrigerant-introducing-passage 5 opens toward the lower space 4. The pipe 60 disposed along the central axis of the tank main body 1 constitutes a refrigerant-discharging-passage 6. The refrigerant-discharging-passage 6 has an inlet 6a which opens toward the upper space 3 at the upper end central portion of the desiccant-filled-portion 2. The refrigerant-discharging-passage 6 extends along the central axis of the tank main body 1 and penetrates the central portion of the bottom wall 1a to be communicated with the exterior of the tank main body 1. The inlet 6a has an enlarged-diameter-portion 61 in the shape of a bell which opens toward the upper space 3. Moreover, the desiccant-filled-portion 2 includes upper and lower porous plates 21a and 21b and spherical desiccant particles 2a filled between the plates 21a and 21b. Between the upper porous plate 21a and the top of the filled spherical desiccant particles 2a, a filter 7 made of fine porous materials is disposed.

The inlet 5b of the refrigerant-introducing-passage 5 of the receiver-dryer RD is connected to the condensing portion outlet 17b of the subcooling system condenser 10. Moreover, the outlet 6b of the refrigerant-discharging passage 6 is communicated with the subcooling portion inlet 18a via an L-shaped pipe 19.

In the above-mentioned condensing apparatus, as shown in FIG. 2, the gaseous refrigerant of high temperature and high pressure from the compressor CP of the refrigeration cycle is introduced into the condensing portion C via the condensing portion inlet 17a of the subcooling system condenser 10. The gaseous refrigerant passes through the first pass C1 to the third pass C3 in turn. When passing through these passes C1 to C3, the gaseous refrigerant exchanges heat with the ambient air to be condensed, and flows into the receiver dryer RD via the condensing portion outlet 17b as a mixture of a gaseous refrigerant and a liquefied refrigerant. And the refrigerant, which is a mixture of a gaseous refrigerant and a liquefied refrigerant, is separated into the gaseous refrigerant and the liquefied refrigerant in the receiver-dryer RD. Then, the liquefied refrigerant passes through the refrigerant-discharging-passage 6 and flows into the subcooling portion S via the subcooling portion inlet 18a. In the subcooling portion S, the liquefied refrigerant further exchanges heat with the ambient air to be subcooled. The subcooled refrigerant is then sent to the following cycle part (an evaporator side) via the subcooling portion outlet 18b.

In the meantime, the refrigerant, which is a mixture of a gaseous refrigerant and a liquefied refrigerant sent from the condensing portion C of the subcooling system condenser 10, is sent into the receiver-dryer RD at a high flow velocity. However, when the refrigerant flows into the lower space 4 through the refrigerant-introducing-passage 5, it diffuses widely, resulting in a decreased flow velocity. Furthermore, since the desiccant-filled-portion 2 functions as a resistance layer to the refrigeration flow going up through the desiccant-filled-portion 2, the upstream flow velocity is reduced remarkably and the refrigerant slowly flows into the upper space 3. Especially, in this embodiment, the refrigerant passing through the spherical particles 2a of the desiccant-filled-portion 2 changes its direction frequently to take a long course. Therefore, the flow velocity reduces remarkably and a local high velocity flow also disappears due to the rectification function, resulting in an uniform upstream flow. Moreover, when passing through the filter 7, the liquefied refrigerant and the gaseous refrigerant will be dispersed finely.

Therefore, the liquefied refrigerant, which is slow in flow velocity as compared with a gaseous refrigerant, passes through the desiccant-filled-portion 2 to reach an upper space 3, which results in a further reduced flow velocity. Accordingly, the liquefied refrigerant P accumulates in the upper space 3 without causing turbulence. On the other hand, the flow velocity of the gaseous refrigerant is also abruptly reduced when the gaseous refrigerant passes through the desiccant-filled-portion 2. Accordingly, when the gaseous refrigerant reaches the accumulated liquefied refrigerant P accumulated in the upper space 3, it calmly goes up in the liquefied refrigerant as bubbles B. Consequently, the gaseous refrigerant goes up through the surface of the accumulated liquefied refrigerant and accumulates above the surface without disturbing the surface. As a result, the surface F of the accumulated liquefied refrigerant P stabilizes with few fluctuations.

On the other hand, since the inlet 6a of the refrigerant-discharging-passage 6 is located at the bottom of the accumulated liquefied refrigerant P stably accumulated in the upper space 3, only the liquefied refrigerant of the accumulated liquefied refrigerant P flows into the refrigerant-discharging-passage 6 via the inlet 6a thereof, and is thus stably supplied to the subcooling portion S. In this case, since the enlarged-diameter-portion 61 formed at the inlet 6a of the refrigerant-discharging-passage 6 serves as a dented portion at the upper end of the desiccant-filled-portion 2, the liquefied refrigerant easily flows into the refrigerant-discharging-passage 6. Furthermore, since the flow velocity at the enlarged-diameter-portion 61 is slower than that at the inner side of the non-enlarged-diameter-portion of the refrigerant-discharging-passage 6, even if bubbles B of the gaseous refrigerant appears near the inlet 6a, the bubbles B easily goes upward in the enlarged-diameter-portion 61. Therefore, very few bubbles B are involved in the liquefied refrigerant flowing into the refrigerant-discharging-passage 6.

Therefore, in the subcooling portion S, the subcooling function can be demonstrated to the maximum extent, which can secure a sufficient subcooling area. In the refrigeration cycle including such a condensing apparatus employing the aforementioned receiver-dryer RD, it is possible to fill an appropriate amount of the refrigerant at an earlier stage. Moreover, since the steady region between the optimum point and the excessive point of a refrigerant amount can be expanded by using the surplus space in the tank main body 1 as a buffer space, the stable operation of the whole refrigeration cycle can be performed. Furthermore, since the operation pressure can be kept low, a required power can be reduced, resulting in an improved system coefficient.

Figure 7:
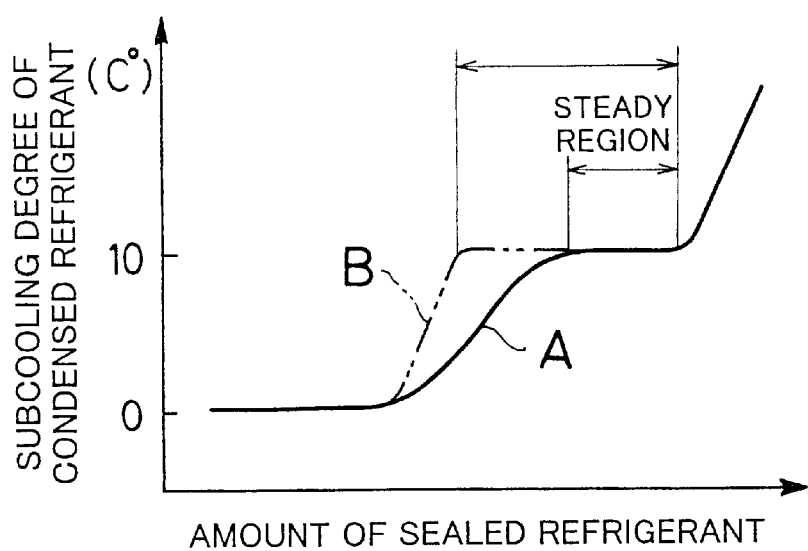
FIG. 7 is a correlation characteristic figure showing the correlation between a subcooling degree of a condensed refrigerant and an amount of sealed refrigerant.
Figure 8A:
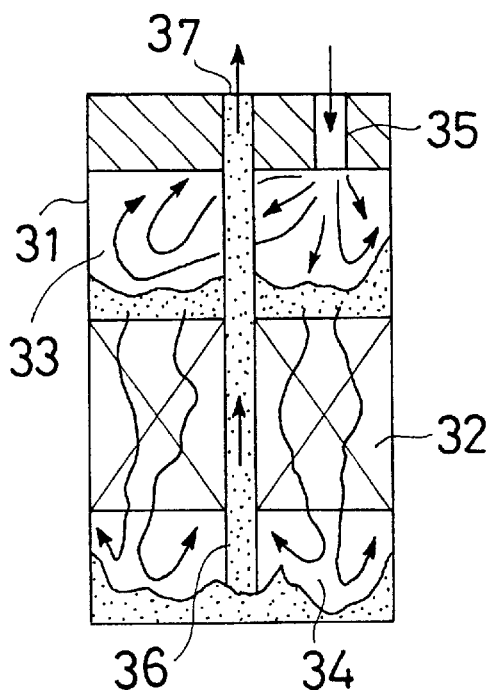
FIG. 8A is a schematic vertical cross-sectional view of a conventional sucking-pipe-type receiver-dryer.
Figure 8B:
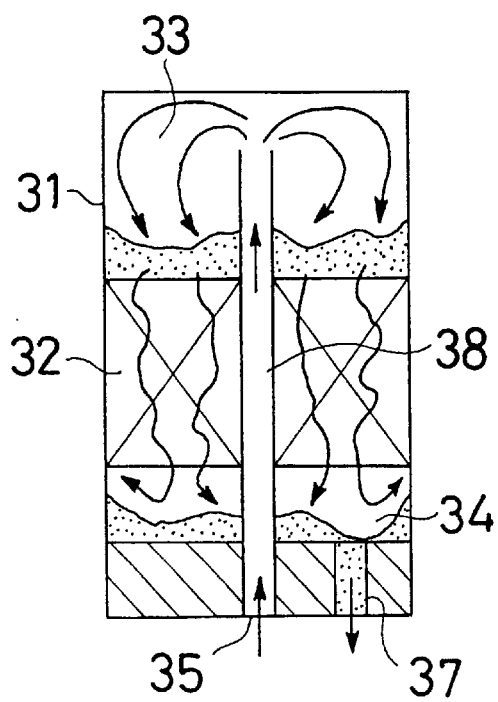
FIG. 8B is a schematic vertical cross-sectional view of a conventional supplying-pipe-type receiver-dryer.
Figure 8C:
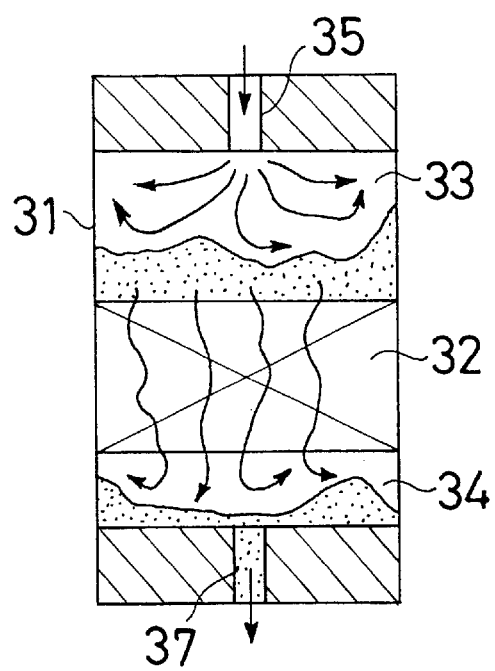
FIG. 8C is a schematic vertical cross-sectional view of a conventional inlet-outlet-confrontation-type receiver-dryer.
Figure 8D:
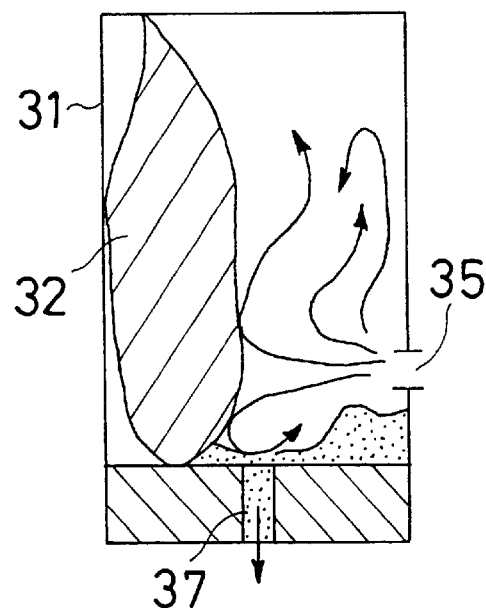
FIG. 8D is a schematic vertical cross-sectional view of a conventional bag-type receiver-dryer.

The above-mentioned action can be explained by using the correlation characteristic between the subcooling degree of the condensed refrigerant and the amount of sealed refrigerant obtained by the charge examination shown in FIG. 7 such that the subcooling degree goes up sharply and reaches the steady region start point at the fewer sealed refrigerant side, and the width of steady region becomes wider. In other words, it means that the curve A approaches the ideal curve B shown by the phantom line in FIG. 7.

Therefore, in the automobile air conditioner using this condensing apparatus, the miniaturization by decreasing the sealed refrigerant amount can be easily performed, the performance stability to load fluctuation ca n be improved and the performance deterioration with time due to continuous running can also be prevented effectively.

Moreover, since the structure of the refrigerant-discharging-passage 6 and the refrigerant-introducing-passage 5 of the receiver-dryer RD differ slightly as compared to that of a condensing apparatus in a conventional refrigeration cycle, an existing condenser including a subcooling portion can be used as it is. As for the receiver-dryer RD, it is not required to drastically change the fundamental structure of a conventional receiver-dryer. Furthermore, since the desiccant-filled-portion 2 itself demonstrates a rectification function, special rectification means such as a rectification board can be omitted, which is advantageous in manufacturing cost.

Figure 5A:
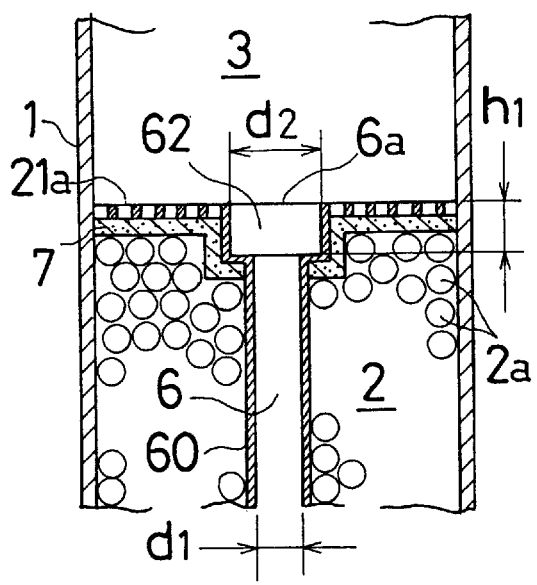
FIG. 5A is a schematic vertical cross-sectional front view of the principal portion of a modification of the receiver-dryer.

In addition, the refrigerant-discharging-passage 6 of the receiver-dryer RD in the aforementioned embodiment has an enlarged-diameter-portion 61 which upwardly opens in the shape of a bell. However, as shown in FIG. 5A, the enlarged-diameter-portion 62 may be discontinuously enlarged to the inner side (non-enlarged-diameter-portion) of the refrigerant-discharging-passage 6. In order to effectively obtain the functions caused by the enlarged-diameter-portion 61 or 62 of the refrigerant-introducing-passage 6, it is recommended to satisfy the following conditions: $d1<d2 \leq 3d1$, and $d1<h1 \leq 5d1$, wherein the inner diameter of the non-enlarged-diameter-portion of the inlet of the refrigerant-discharging-passage 6, the maximum opening diameter of the enlarged-diameter-portion 61 or 62 and the depth of the enlarged-diameter-portion 61 or 62 are defined by $d1$, $d2$ and $h1$, respectively. Moreover, it is preferable that the depth $h1$ of the enlarged-diameter-portion 61 or 62 is not larger than the longitudinal length Ld of the desiccant-filled-portion 2, i.e., it is preferable to satisfy the following condition: $h1 \leq Ld$.

Figure 5B:
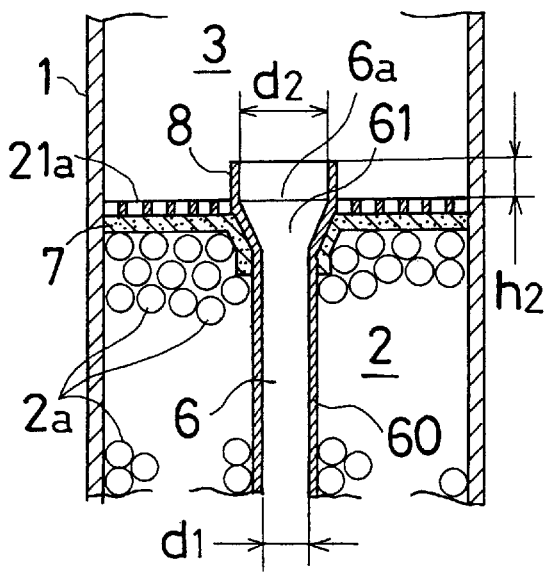
FIG. 5B is a schematic vertical cross-sectional front view of the principal portion of another modification of the receiver-dryer.
Figure 6:
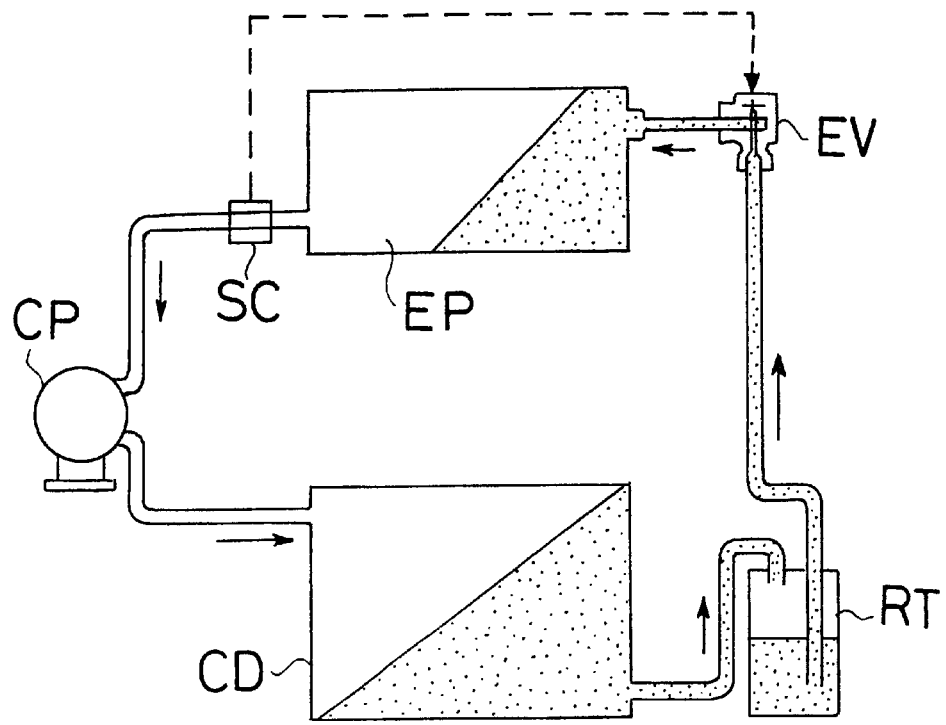
FIG. 6 is a refrigerant circuit diagram of a refrigeration cycle.

FIG. 5B shows a further modification of a receiver-dryer RD.

In this receiver-dryer RD, a bubble-swallow-prevention wall 8 of a cylindrical shape is formed at the opening peripheral edge of the enlarged inlet 6a of the refrigerant-discharging-passage 6. Therefore, the bubbles B of the gaseous refrigerant going up through the accumulated liquefied refrigerant P in the upper space 3 is hardly involved into the liquefied refrigerant P flowing toward the inlet 6a, resulting in a decrease amount of gaseous refrigerant flowed into the refrigerant-discharging-passage 6.

In order to effectively obtain the function of the bubble-swallow-prevention wall 8 without causing any interruption of the liquefied refrigerant flow into the refrigerant-discharging-passage 6, it is preferable that the following condition is satisfied: $h2 \leq 2d1$, wherein the inner diameter of the refrigerant-discharging-passage 6 and the height of the bubble-swallow-prevention wall 8 are defined by d1 and h2, respectively.

Furthermore, in the receiver-dryer RD according to the present invention, the size and arrangement of each part can be set arbitrarily. However, it is preferable that the following conditions are satisfied: $1.5\phi \leq L1 \leq 0.8D$, wherein the distance between the center of the refrigerant-introducing-passage 5 and the center of the refrigerant-discharging-passage 6, the inner diameter of the tank main body 1 and the opening diameter of the outlet 5a of the refrigerant-introducing-passage 5 are defined by L1, D and $\phi$, respectively (see FIG. 4). In this case, since the opening center of the refrigerant-introducing-passage 5 and the outlet center of the refrigerant-discharging-passage 6 are moderately apart from each other, the upstream flow of the refrigerant introduced from the refrigerant-introducing-passage 5 will not be concentrated on the inlet 6a side of the refrigerant-discharging-passage 6, which further reduces the refrigerant flow velocity and further stabilizes the refrigerant surface.

On the other hand, it is not recommended that the above-mentioned distance L1 is too short, and/or the refrigerant-introducing-passage 5 has a cylindrical shape surrounding the refrigerant-discharging-passage 6 because the upstream flow through the refrigerant-introducing-passage 5 will concentrate on the inlet 6a side of the refrigerant-discharging-passage 6 and thereby a decrease of the refrigerant flow velocity near the refrigerant-discharging-passage 6 may become inadequate.

In the above-mentioned embodiment, the lower space 4 is formed underneath the desiccant-filled-portion 2 in the tank main body 1. Instead, the desiccant-filled-portion 2 may be disposed on the inner bottom of the tank main body 1 without forming the aforementioned lower space 4 so that the refrigerant from the refrigerant-introducing-passage 5 flows directly into the desiccant-filled-portion 2. However, if the lower space 4 exists, there is an advantage such that the diffusion of refrigerant flowed from the refrigerant-introducing-passage 5 can be made smoothly and the refrigerant flow velocity decrease functions due to the aforementioned diffusion becomes effective. If the height of the lower space 4 is set to 25% or less of the vertical length of the desiccant-filled-portion 2, a turbulent flow region will not be produced. Furthermore, since there is no room to generate a large amount of accumulated liquefied refrigerant, a supply of the liquefied refrigerant to the upper space 3 can be fully secured. Moreover, the lower space 4 may be filled up with a resistance object which permits a flow of a liquefied refrigerant and a gaseous refrigerant.

In order to obtain a sufficient space for accumulating a liquefied refrigerant and a gaseous refrigerant in the upper space 3 of the tank main portion 1, it is desirable that the following condition is satisfied: $Ld \leq 0.7Le$, wherein the vertical length of the desiccant-filled-portion 2 and an effective vertical length of the tank main body 1 are defined by Ld and Le, respectively.

In addition, in a case where a receiver-dryer RD is used in an inclined state, the inlet 6a of the refrigerant-discharging-passage 6 is set to be located below the center of the inclined tank main body 1.

Although the condensing apparatus according to the present invention can be suitably applied especially for a refrigeration cycle having a subcooling portion in addition to a condensing portion as in the aforementioned embodiment, it is also applicable to various refrigeration cycles with no subcooling portion.

Moreover, the subcooling portion may be included in a refrigeration cycle as an independent heat exchanger instead of being integrally provided to the condenser like the subcooling system condenser of the aforementioned embodiment.

Furthermore, the condenser may be the so-called parallel flow type heat exchanger as illustrated in FIG. 1, or the so-called serpentine type heat exchanger having a meandering heat exchanging tube.

This application claims priority to Japanese Patent Application No. 2000-244199 filed on Aug. 11, 2000, the disclosure of which is incorporated by reference in its entirety.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. A condensing apparatus, comprising:

a condenser having a condensing portion for condensing a gaseous refrigerant; and a receiver-dryer which receives a condensed refrigerant condensed by said condensing portion, separates the condensed refrigerant into a gaseous refrigerant and a liquefied refrigerant, and removes moisture contained in the condensed refrigerant, wherein said receiver-dryer includes:

a tank main body;

a desiccant-filled-portion arranged so that an upper space is formed in said tank main body at an upper part thereof;

a refrigerant-introducing-passage for introducing the condensed refrigerant into said tank main body from said condenser; and a refrigerant-discharging-passage for discharging the liquefied refrigerant in said tank main body, wherein said refrigerant-introducing-passage has an outlet which opens toward an inner bottom side of said tank main body, wherein said refrigerant-discharging-passage penetrates said desiccant-filled-portion and has an inlet formed so as to open toward said upper space at an upper end of said desiccant-filled-portion and an outlet formed at a bottom portion of said tank main body, whereby the condensed refrigerant is introduced into an inner bottom of said tank main body through said outlet of said refrigerant-introducing-passage from said condensing portion, and passes through said desiccant-filled-portion upward to be accumulated in said upper space, and the accumulated liquefied refrigerant is introduced into said inlet of said refrigerant-discharging-passage and flows out of said tank main body via said outlet.

2. The condensing apparatus as recited in claim 1, further comprising a subcooling portion which subcools the refrigerant condensed by said condensing portion of said condenser, wherein said outlet of said condensing portion is connected to said inlet of said refrigerant-introducing-passage of said receiver-dryer, and wherein said outlet of said refrigerant-discharging-passage of said receiver-dryer is connected to said inlet of said subcooling portion.

3. The condensing apparatus as recited in claim 2, wherein said subcooling portion is integrally provided at a downstream side of said condensing portion of said condenser.

4. The condensing apparatus as recited in claim 1, wherein said inlet of said refrigerant-discharging-passage has an enlarged-diameter-portion having a diameter enlarging toward said upper space.

5. The condensing apparatus as recited in claim 4, wherein the following conditions are satisfied:

$$d1<d2\leq 3d1,$$

and $$d1<h1\leq 5d1,$$

wherein an inner diameter of a non-enlarged-diameter-portion of said inlet of said refrigerant-discharging-passage, a maximum opening diameter of said enlarged-diameter-portion and a depth of said enlarged-diameter-portion are defined by d1, d2 and h1, respectively.

6. The condensing apparatus as recited in claim 4, wherein said inlet of said refrigerant-discharging-passage has a cylindrical bubble-swallow-prevention wall extending upward from an upper end of said enlarged-diameter-portion.

7. The condensing apparatus as recited in claim 6, wherein the following condition is satisfied:

$$h2<2d1,$$

wherein an inner diameter of said refrigerant-discharging-passage and a height of said bubble-swallow-prevention-wall are defined by d1 and h2, respectively.

8. The condensing apparatus as recited in claim 1, wherein the following conditions are satisfied:

$$1.5\phi \leq L1 \leq 0.8D,$$

wherein a distance between a center of said refrigerant-introducing-passage and a center of refrigerant-discharging-passage, an inner diameter of said tank main body and an opening diameter of said outlet of said refrigerant-introducing-passage are defined by L1, D and $\phi$, respectively.

9. The condensing apparatus as recited in claim 1, wherein the following condition is satisfied:

$$Ld \leq 0.7Le,$$

wherein a vertical length of said desiccant-filled-portion and an effective vertical length of said tank main body are defined by Ld and Le, respectively.

10. The condensing apparatus as recited in claim 1, wherein a space is formed between a lower end of said desiccant-filled-portion and an inner bottom of said tank main body, said space having a vertical height of 25% or less of a vertical length of said desiccant-filled-portion.

11. The condensing apparatus as recited in claim 1, wherein said desiccant-filled-portion includes a pair of porous dividing walls arranged at a predetermined interval, a dryer including spherical particles filled up between said porous dividing walls, and a filter arranged between said dryer and at least one of said porous dividing walls.

12. A receiver-dryer which is arranged at a downstream side of a condensing portion of a condenser in a refrigeration cycle to receive a condensed refrigerant condensed by said condensing portion of said condenser, separate the condensed refrigerant into a gaseous refrigerant and a liquefied refrigerant and remove moisture contained in the condensed refrigerant, said receiver-dryer comprising:

a tank main body;

a desiccant-filled-portion arranged so that an upper space is formed at an upper part in said tank main body;

a refrigerant-introducing-passage for introducing the condensed refrigerant into said tank main body from said condenser; and a refrigerant-discharging-passage for discharging the liquefied refrigerant in said tank main body, wherein said refrigerant-introducing-passage has an outlet which opens toward an inner bottom side of said tank main body, wherein said refrigerant-discharging-passage penetrates said desiccant-filled-portion and has an inlet formed so as to open toward said upper space at an upper end of said desiccant-filled-portion and an outlet formed at a bottom portion of said tank main body, whereby said condensed refrigerant is introduced into an inner bottom of said tank main body through said outlet of said refrigerant-introducing-passage from said condensing portion of said condenser, and passes through said desiccant-filled-portion upward to be accumulated in said upper space, and the accumulated liquefied refrigerant is introduced into said inlet of the said refrigerant-discharging-passage and flows out of said tank main body via said outlet.

13. The condensing apparatus as recited in claim 12, wherein said inlet of said refrigerant-discharging-passage has an enlarged-diameter-portion having a diameter enlarging toward said upper space.

14. The condensing apparatus as recited in claim 13, the following conditions are satisfied:

$$d1<d2\leq 3d1,$$

and $$d1<h1\leq 5d1,$$

wherein an inner diameter of a non-enlarged-diameter-portion of said inlet of said refrigerant-discharging-passage, a maximum opening diameter of said enlarged-diameter-portion and a depth of said enlarged-diameter-portion are defined by d1, d2 and h1, respectively.

15. The condensing apparatus as recited in claim 13, wherein said inlet of said refrigerant-discharging-passage has a cylindrical bubble-swallow-prevention wall extending upward from an upper end of said enlarged-diameter-portion.

16. The condensing apparatus as recited in claim 15, wherein the following condition is satisfied:

$$h2 \leq 2d1,$$

wherein an inner diameter of said refrigerant-discharging-passage and a height of said bubble-swallow-prevention wall are defined by d1 and h2, respectively.

17. The condensing apparatus as recited in claim 12, wherein the following conditions are satisfied:

$$1.5\phi \leq L1 \leq 0.8D,$$

wherein a distance between a center of said refrigerant-introducing-passage and a center of refrigerant-discharging-passage, an inner diameter of said tank main body and an opening diameter of said outlet of said refrigerant-introducing-passage are defined by L1, D and $\phi$, respectively.

18. The condensing apparatus as recited in claim 12, wherein the following condition is satisfied:

$$Ld \leq 0.7Le,$$

wherein a vertical length of said desiccant-filled-portion and an effective vertical length of said tank main body are defined by Ld and Le, respectively.

19. The condensing apparatus as recited in claim 12, wherein a space is formed between a lower end of said desiccant-filled-portion and an inner bottom of said tank main body, said space having a vertical height of 25% or less of a vertical length of said desiccant-filled-portion.

20. The condensing apparatus as recited in claim 12, wherein said desiccant-filled-portion includes a pair of porous dividing walls arranged at a predetermined interval, a dryer including spherical particles filled up between said porous dividing walls, and a filter arranged between said dryer and at least one of said porous dividing walls.

* * * * *

UNITED STATES PATENT AND TRADEMARK OFFICE
CERTIFICATE OF CORRECTION

PATENT NO.   : 6,330,810 B1  
DATED        : December 18, 2001  
INVENTOR(S)  : Keiji Yamazaki et al.

It is certified that error appears in the above-identified patent and that said Letters Patent is hereby corrected as shown below:

<u>Title page,</u>
Item [54], Title, after "CYCLE", insert -- AND --

<u>Column 13,</u>
Line 22, delete "$h2<2dl$" and insert -- $h2 \leq 2d1$ --

Signed and Sealed this

Fourth Day of June, 2002

Attest:

Attesting Officer

JAMES E. ROGAN
*Director of the United States Patent and Trademark Office*